Sept. 6, 1927.
E. R. GODFREY
1,641,381
REBOUND CHECK
Filed April 2, 1926
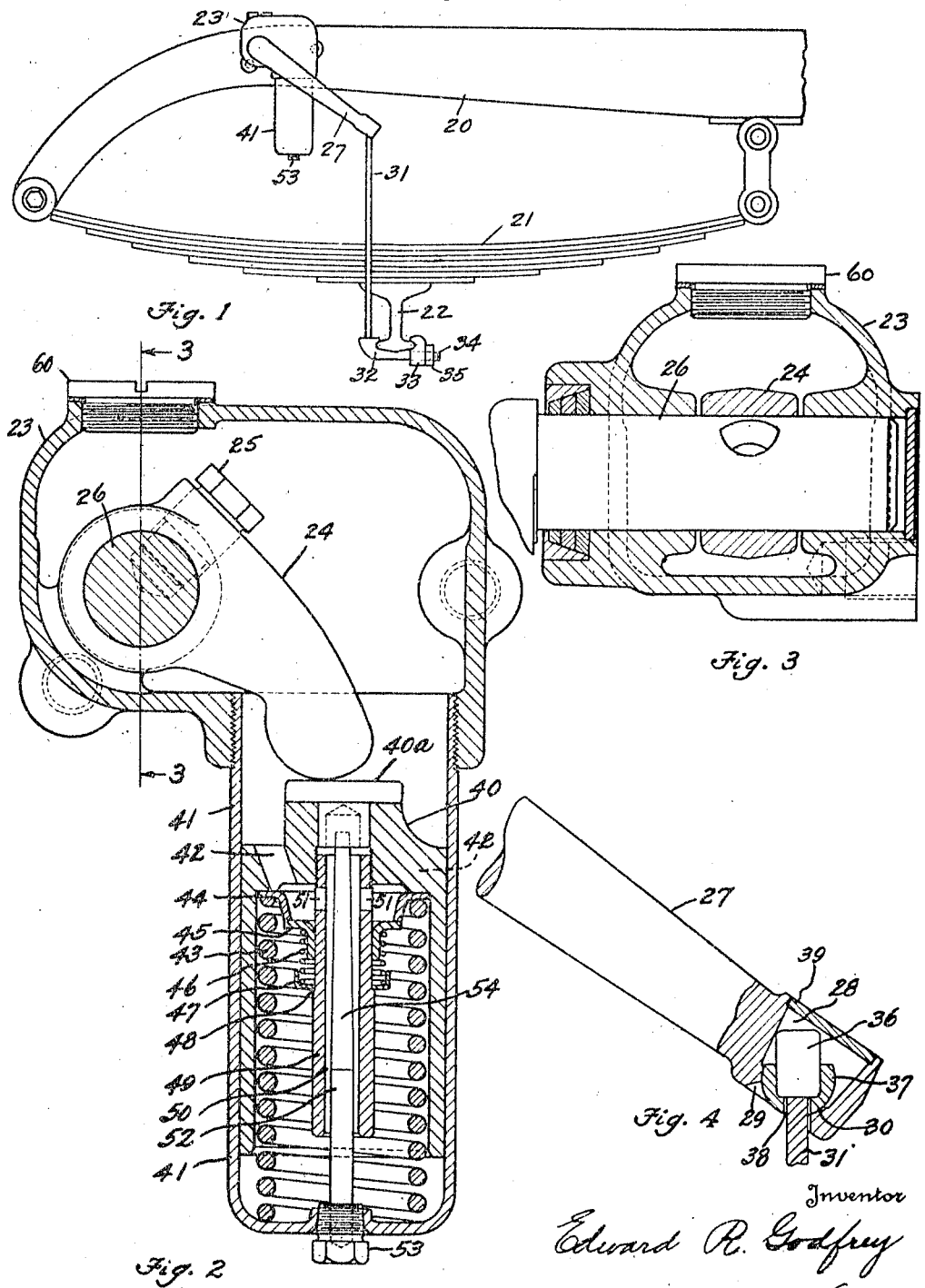
Inventor
Edward R. Godfrey
By Spencer, Sewall & Hardman
his Attorneys Patented Sept. 6, 1927.

1,641,381

UNITED STATES PATENT OFFICE.

EDWARD R. GODFREY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

REBOUND CHECK.

Application filed April 2, 1926. Serial No. 99,394.

This invention relates to rebound checks for automobiles and other vehicles which have a frame or body supported by springs upon the road wheel axles.

One of the objects of the invention is to provide certain improvements in the hydraulic type rebound check, such as disclosed in the copending application of George W. Elsey, Serial No. 99,371, filed April 2, 1926 (RY-2899), and more particularly to provide for the adaptation of a rebound check to different makes of vehicles by the substitution of certain parts for others which may be removed without disassembling the structure.

Further objects and advantages of the present invention will be apparent from the following description, reference being had to the accompanying drawings, wherein a preferred form of embodiment of the present invention is clearly shown.

In the drawings:

Fig. 1 is a diagrammatic fragmentary side view showing the vehicle frame and axle and a form of the present invention applied thereto.

Fig. 2 is a longitudinal sectional view of the rebound check.

Fig. 3 is a sectional view on the line 3—3 of Fig. 2.

Fig. 4 is a fragmentary view, partly in section, showing the method of connecting the rebound check operating arm with the vehicle axle.

Referring to Fig. 1, 20 designates the frame member of a vehicle which is supported by springs, one of which is shown at 21 upon an axle 22 to which the road wheels are connected. The rebound check includes a bracket 23 which is attached in any suitable manner either to the axle member or to the frame member and preferably to the latter. The bracket 23 supports and provides a housing for an oscillatable part or lever 24 which is attached by a screw 25 to a shaft 26. One end of the shaft 26 projects through a side wall of the bracket 23 and is connected with a lever 27. Referring to Fig. 4 the free end of the lever 27 is apertured to provide recesses 28 and 29 which are separated by an annular ledge having a segmental-spherical surface 30. The lever 27 is connected with the axle 22 by a cable 31 having its lower end attached to a clamp bolt 32 which passes through a clamping washer 33 and has a threaded end 34 cooperating with a nut 35. When the nut 35 is tightened the clamping members 32 and 33 will securely embrace the lower flange of the axle 22. The upper end of the cable 31 is attached to a cylindrical metal head 36 which is received within a recess provided by spherical member 37 having an aperture 38 for receiving the cable 31. The member 37 is received by the spherical bearing surface 30. To exclude dirt, the recess 28 is closed by cover disc 39.

The separation of the frame 20 from the axle 22, due to the rebound of the vehicle, is checked or retarded by apparatus which coacts with the oscillatable member or lever 24. This apparatus includes a piston 40 which is slidable within a liquid receiving cylinder 41 attached to the bracket 23. The piston 40 is provided with a wear piece 40ª engageable with the lever 24, and with apertures 42 therethrough. Obviously downward movement of the piston is produced by the clockwise rotation of the lever 24 as viewed in the drawings, and upward movement of the piston is produced by a spring 43 bearing at its lower end against the bottom wall of the cylinder 41 and bearing at its upper end against an annular valve seat member 44 which is located adjacent the passage 42. An annular valve member 45 cooperates with the valve seat 44 and is urged toward the closed position by a spring 46 bearing at its upper end against the valve 45 and its lower end against a cup-shaped washer 47. Downward movement of the washer 47 is restrained by engagement of the washer with an annular shoulder 48 which is provided by a tube 49 located axially of the piston and having its upper end threaded into the head of the piston. The central passage 50 of the tube 48 is connected by side openings 51 with the space surrounded by the valve seat 44. In this manner the tube 49 provides a by-pass around the check valve member 45. The tube 49 also provides a guide for the valve member 45.

A suitable rebound retarding liquid is poured into through an opening which is closed by a plug 60.

The flow of liquid through the passage 50 is controlled by metering pin 52 which extends through the tube 49 and is attached at its lower end to a plug 53 threaded into the bottom wall of the cylinder 41. It is therefore apparent that the metering pin 52 may be removed from the rebound check while the other parts thereof remain assembled.

It will be noted that the metering pin is not uniform in diameter but that its cross sectional dimensions are variable. This feature is present for the purpose of variably restricting the passage of liquid through the metering orifice 50 in order that the checking action will vary for different positions of the vehicle with respect to the axle. Figs. 1 and 2 show the rebound checking apparatus in position taken by it when the vehicle frame is at the maximum distance from the axles. The pin 52 includes a conical, tapering portion 54. Therefore the rebound snubbing action will be gradually increased as the distance of rebound increases, since the cross sectional area of the passage between the pin 52 and the tube 49 will gradually decrease.

The invention is not limited to the use of the tapered metering pin shown, but other pins having different longitudinal sectional contours may be substituted for the one shown in order to produce a checking action best suited to the particular vehicle to which the rebound check is attached. As explained, the metering pin may be changed without disassembling the other parts of the apparatus.

In order to reduce the noise produced by the flow of liquid through the metering passage, the tube 49 has a smooth central passage of substantially uniform diameter and the wall of the tube is relatively thick. The annular passage between the pin and the interior surface of the tube is one which gradually increases in cross sectional dimensions so that there is no sudden change in velocity of the liquid as it is forced through the metering passage. Since the change in velocity is very gradual, the liquid will not surge or swirl or pound the sides of the metering tube to an extent such as to produce noise. Furthermore, there is less tendency for a thick-walled tube to vibrate to an extent sufficient to produce objectionable sound.

While the form of embodiment of the present invention as herein disclosed, constitutes a preferred form, it is to be understood that other forms might be adopted, all coming within the scope of the claims which follow.

What is claimed is as follows:

1. A rebound check for a vehicle having frame and axle members, comprising in combination, a bracket adapted to be attached to one of said vehicle members; an oscillatable part supported by the bracket; means for connecting said part with the other vehicle member; a fluid containing cylinder attached to the bracket; a piston operated in one direction by said part, and having a passage therethrough; a spring for moving the piston in the other direction; a check valve for said piston passage; a tube attached to the piston and providing a by-pass around the check valve and providing a guide for the check valve; a spring encircling the tube for holding the check valve in position; and a metering pin detachably secured to the cylinder and extending within the tube.

2. A rebound check for a vehicle having frame and axle members, comprising in combination, a bracket adapted to be attached to one of said vehicle members; an oscillatable part supported by the bracket; means for connecting said part with the other vehicle member; a fluid containing cylinder attached to the bracket; a piston operated in one direction by said part, and having a passage therethrough; a spring for moving the piston in the other direction; a check valve for said piston passage and including an annular valve member; a tube attached to the piston axially thereof and providing a by-pass around the check valve and extending through the valve member to provide a guide therefor; a spring surrounding the tube and urging the valve member into closed position; and a metering pin detachably secured to the cylinder and extending within the tube.

3. A rebound check for a vehicle having frame and axle members, comprising in combination, a bracket adapted to be attached to one of the said vehicle members; an oscillatable part supported by the bracket; means for connecting said part with the other vehicle member; a fluid containing cylinder attached to the bracket; a piston operated in one direction of said part, and having a passage therethrough; an annular valve seat adjacent said piston passage; a spring for moving the piston in the other direction and for holding the valve seat in position; an annular valve member cooperating with said seat; a tubular guide for said valve member attached to the piston and extending through the valve seat and providing a by-pass around the valve; a spring encircling the tube for holding the check valve in position; and a metering pin detachably secured to the cylinder and extending within the tube.

In testimony whereof I hereto affix my signature.

EDWARD R. GODFREY.